(12) United States Patent
Bobeck et al.

(10) Patent No.: US 12,515,999 B2
(45) Date of Patent: Jan. 6, 2026

(54) LOW TEMPERATURE STABLE AQUEOUS FORMULATIONS OF N-(n-BUTYL) THIOPHOSPHORIC TRIAMIDE

(71) Applicant: KOCH AGRONOMIC SERVICES, LLC, Wichita, KS (US)

(72) Inventors: Drew R. Bobeck, Decatur, GA (US); Jessica W. Giles, Snellville, GA (US)

(73) Assignee: KOCH AGRONOMIC SERVICES, LLC, Wichita, KS (US)

( * ) Notice: Subject to any disclaimer, the term of this patent is extended or adjusted under 35 U.S.C. 154(b) by 826 days.

(21) Appl. No.: 17/787,363

(22) PCT Filed: Dec. 17, 2020

(86) PCT No.: PCT/IB2020/062150
§ 371 (c)(1),
(2) Date: Jun. 20, 2022

(87) PCT Pub. No.: WO2021/124223
PCT Pub. Date: Jun. 24, 2021

(65) Prior Publication Data
US 2023/0016572 A1    Jan. 19, 2023

Related U.S. Application Data

(60) Provisional application No. 62/951,272, filed on Dec. 20, 2019.

(51) Int. Cl.
| | | |
|---|---|---|
| *C05G 3/90* | (2020.01) | |
| *C05F 11/08* | (2006.01) | |
| *C05G 5/23* | (2020.01) | |

(52) U.S. Cl.
CPC ............... *C05G 3/90* (2020.02); *C05F 11/08* (2013.01); *C05G 5/23* (2020.02)

(58) Field of Classification Search
CPC ............. C05G 3/90; C05G 5/23; C05F 11/08
See application file for complete search history.

(56) References Cited

U.S. PATENT DOCUMENTS

| | | | |
|---|---|---|---|
| 9,790,134 B2 | 10/2017 | Bobeck et al. | |
| 11,124,462 B1 * | 9/2021 | Hocking | C07F 9/224 |
| 11,866,383 B1 * | 1/2024 | Hocking | C05G 3/90 |
| 2015/0299062 A1 * | 10/2015 | McKnight | C09K 15/30 |
| | | | 252/406 |
| 2019/0048260 A1 | 2/2019 | Waliwitiya | |
| 2019/0335747 A1 * | 11/2019 | Bobeck | C05G 3/90 |
| 2020/0231514 A1 * | 7/2020 | McKnight | C05C 11/00 |
| 2021/0253491 A1 * | 8/2021 | Liu | C09K 15/12 |
| 2023/0257316 A1 * | 8/2023 | Iannotta | C05G 5/23 |
| | | | 71/31 |
| 2024/0286968 A1 * | 8/2024 | McKnight | C05C 9/005 |
| 2024/0308930 A1 * | 9/2024 | McKnight | C05F 17/00 |

FOREIGN PATENT DOCUMENTS

| | | | | |
|---|---|---|---|---|
| CN | 110041140 A | * | 7/2019 | ............... C05G 3/00 |
| WO | 2015104698 A2 | | 7/2015 | |
| WO | 2016137815 A1 | | 9/2016 | |
| WO | 2019211815 A1 | | 11/2019 | |
| WO | 2020100032 A1 | | 5/2020 | |

OTHER PUBLICATIONS

International Preliminary report on Patentability received for PCT application No. PCT/IB2020/062150, mailed on Jun. 30, 2022, 10 pages.
International search report and written opinion received for PCT application No. PCT/IB2020/062150, mailed on Apr. 1, 2021, 12 pages.

* cited by examiner

*Primary Examiner* — Wayne A Langel

(57) ABSTRACT

The present disclosure relates to a low temperature stable aqueous formulation of N-(n-butyl) thiophosphoric triamide (NBPT) with stability against crystallization and/or freezing upon exposure to low temperatures of 0° C. or below. Formulations of the present disclosure may also contain water-soluble agents such as microbial strains. The present disclosure also provides methods to make and use the formulation according to the present disclosure.

19 Claims, No Drawings

LOW TEMPERATURE STABLE AQUEOUS FORMULATIONS OF N-(n-BUTYL) THIOPHOSPHORIC TRIAMIDE

This application is a national stage filing under 35 U.S.C. § 371 of International Application No. PCT/IB2020/062150, filed on Dec. 17, 2020, which claims the benefit of priority to U.S. Provisional Application No. 62/951,272, filed Dec. 20, 2019, both of which are incorporated herein by reference in their entirety.

The present disclosure relates to a low temperature stable aqueous formulation of N-(n-butyl) thiophosphoric triamide (NBPT) with stability against crystallization and/or freezing upon exposure to low temperatures of 0° C. or below. Formulations of the present disclosure may also contain water-soluble agents such as microbial strains. The present disclosure also provides methods to make and use the formulations according to the present disclosure.

Fertilizers are used to enhance plant and crop production and overcome poor soil quality. Most commonly employed commercially available nitrogen containing fertilizers are inorganic chemical fertilizers such as urea. The extended use of urea is often associated with negative environmental consequences, such as nitrate contamination in run off and ground water, and emission of ammonia and nitrous oxide to the atmosphere. There are a variety of management practices and technologies that can promote nitrogen use efficiency and alleviate environmental pollution.

One widely used technology is the application of a urease inhibitor in conjunction with urea treatment. Urease inhibitors slow down the enzymatic degradation of urea to ammonia. Urease inhibitors can thus significantly reduce the amount of urea that otherwise has to be applied for effective fertilization. One of the most common urease inhibitors is N-(n-butyl) thiophosphoric triamide (NBPT).

Additionally, fertilizer compositions comprising water-soluble agents, such as microorganisms (so-called "bio-fertilizers" or "bio-stimulants"), are increasingly considered as alternatives or adjuncts to conventional chemical fertilizers. The ability of specific bacterial species to promote plant growth has long been recognized, but practical formulation considerations have hampered their use.

As a result, there remains a need for improved fertilizers and/or fertilizer additives that effectively provide nutrients for plant growth and are simultaneously environmentally safe and non-hazardous. One option is to provide a formulation comprising both a urease inhibitor and a bio-fertilizer(s). An aqueous formulation comprising a urease inhibitor, such as NBPT, would enable its combination with a water-soluble agent, such as a bio-fertilizer. The combination of a urease inhibitor with a water-soluble agent, such as a bio-fertilizer, however, is not straightforward. First, urease inhibitors, such as specifically NBPT, are typically soluble in organic solvent systems (e.g. glycol, complex amines, aryl alcohols) but are poorly soluble in water, while bio-fertilizers are typically cultured and applied as aqueous solutions or suspensions. Second, urease inhibitors or the organic solvents they are dissolved in or dispensed in can weaken or kill the bio-fertilizers when combined.

The present disclosure overcomes these hurdles and provides a formulation that comprises NBPT, a polar aprotic solvent, water, wherein the water optionally comprises a water-soluble agent, such as for example a bio-fertilizer, and optionally comprises a glycol and/or glycol derivative, an alkylene glycol alkyl ether, and/or a dye. Formulations according to the present disclosure are stable to crystallization upon extended exposure to lower temperatures, such as for example, at 0° C. or below.

Specifically, the present disclosure provides a formulation comprising:
i) N-(n-butyl) thiophosphoric triamide (NBPT) in an amount ranging from about 25% to about 60% by weight;
ii) water in an amount ranging from about 7% to about 25% by weight, and wherein the water optionally comprises a water-soluble agent;
iii) a polar aprotic solvent in an amount ranging from about 25% to about 60% by weight; and
iv) optionally a glycol and/or a glycol derivative in an amount ranging from about 1% to about 25% by weight; and/or
v) optionally an alkylene glycol alkyl ether in an amount ranging from about 0.1% to about 25% by weight;
wherein each component is present in an amount by weight of the total formulation.

Formulations of the present disclosure may also comprise a dye. Formulations of the present disclosure exhibit low temperature stability at lower temperatures, such as for example, at 0° C. or below for extended periods of time. Formulations of the present disclosure remain liquids at lower temperatures and resist freezing and/or crystallization.

The formulations of the present disclosure comprise NBPT in an amount ranging from about 25% to about 60% by weight based on the total weight of the formulation, such as from about 27% to about 60%, such as from about 26% to about 60%, such as from about 25% to about 55%, such as from about 25% to about 50%, such as from about 25% to about 45%, such as from about 25% to about 40%, such as from about 25% to about 35%, such as from about 25% to about 30%, or such as from about 26% to about 31%. For example, NBPT is present in an amount ranging from about 26% to about 27%, from about 27% to about 28%, from about 28% to about 29%, from about 29% to about 30%, from about 30% to about 31%, from about 31% to about 32%, from about 32% to about 33%, from about 33% to about 34%, from about 34% to about 35%, from about 35% to about 36%, from about 36% to about 37%, from about 37% to about 38%, from about 38% to about 39%, from about 39% to about 40%, from about 41% to about 42%, from about 42% to about 43%, from about 43% to about 44%, from about 44% to about 45%, from about 45% to about 46%, from about 46% to about 47%, from about 47% to about 48%, from about 48% to about 49%, from about 49% to about 50%, from about 51% to about 52%, from about 52% to about 53%, from about 53% to about 54%, from about 54% to about 55%, from about 55% to about 56%, from about 56% to about 57%, from about 57% to about 58%, from about 58% to about 59%, or from about 59% to about 60%, by weight based on the total formulation. In at least one embodiment, NBPT is present in an amount of about 26.0% by weight. In at least one embodiment, NBPT is present in an amount of about 26.2% by weight. In another embodiment, NBPT is present in an amount of about 30.0% by weight. In another embodiment, NBPT is present in an amount of about 30.3% by weight. In another embodiment, NBPT is present in an amount of about 30.5% by weight. In another embodiment, NBPT is present in an amount of about 30.7% by weight. In another embodiment, NBPT is present in an amount of about 36.7% by weight. In another embodiment, NBPT is present in an amount of about 41.0% by weight.

The formulations of the present disclosure comprise water in an amount ranging from about 7% to about 25% by weight based on the total weight of the formulation such as from about 8% to about 24%, such as from about 8% to about 22%, such as from about 8% to about 20%, such as from about 8% to about 18%, such as from about 8% to about 16%, such as from about 8% to about 14%, such as from about 8% to about 12%, such as from about 9% to about 12%, or such as from about 7% to about 11%. For example, water is present in an amount ranging from about 7% to about 8%, from about 8% to about 9%, from about 9% to about 10%, from about 10% to about 11%, from about 11% to about 12%, from about 12% to about 13%, from about 13% to about 14%, and from about 14% to about 15%. In another embodiment, water is present in an amount of about 7.7% by weight. In another embodiment, water is present in an amount of about 9.1% by weight. In another embodiment, water is present in an amount of about 11.1% by weight. In another embodiment, water is present in an amount of about 14.3% by weight.

The formulations of the present disclosure also include a polar aprotic solvent. Examples of polar aprotic solvents include, but are not limited to, acetone, acetonitrile, butyl carbitol acetate, dichloromethane, dimethylformamide, dimethyl sulfoxide (DMSO), ethyl acetate, N-methyl-2-pyrrolidone (NMP), nitromethane, propylene carbonate, and tetrahydrofuran.

In at least one embodiment, a polar aprotic solvent, such for example NMP or DMSO, is present in the formulation of the present disclosure, in an amount of from about 25% to about 60% by weight of the total weight of the formulation, such as from about 30% to about 50%, such as from about 25% to about 30%, such as from about 30% to about 35%, such as from about 35% to about 40%, such as from about 40% to about 45%, such as from about 45% to about 50%, such as from about 50% to about 55%, and such as from about 55% to about 60%. A polar aprotic solvent may be present in the formulation of the present disclosure in a range of about 24% to about 49%, such as from about 25% to about 48%, such as from about 26% to about 47%, such as from about 27% to about 46%, such as from about 28% to about 45%, such as from about 29% to about 44%, such as from about 30% to about 43%, such as from about 31% to about 42%, such as from about 32% to about 41%, such as from about 33% to about 40%, or such as from about 34% to about 39%. In at least one embodiment, a polar aprotic solvent is present in the formulation of the present disclosure in an amount of about 33.0% by weight. In at least one embodiment, a polar aprotic solvent is present in the formulation of the present disclosure in an amount of about 34.4% by weight. In at least one embodiment, a polar aprotic solvent is present in the formulation of the present disclosure in an amount of about 34.8% by weight. In at least one embodiment, a polar aprotic solvent is present in the formulation of the present disclosure in an amount of about 38.8% by weight. In at least one embodiment, a polar aprotic solvent is present in the formulation of the present disclosure in an amount of about 39.0% by weight. In at least one embodiment, a polar aprotic solvent is present in the formulation of the present disclosure in an amount of about 39.6% by weight. In at least one embodiment, a polar aprotic solvent is present in the formulation of the present disclosure in an amount of about 40.2% by weight. In at least one embodiment, a polar aprotic solvent is present in the formulation of the present disclosure in an amount of about 40.3% by weight. In at least one embodiment, a polar aprotic solvent is present in the formulation of the present disclosure in an amount of about 40.9% by weight. In at least one embodiment, a polar aprotic solvent is present in the formulation of the present disclosure in an amount of about 45.3% by weight. In at least one embodiment, a polar aprotic solvent is present in the formulation of the present disclosure in an amount of about 45.9% by weight. In at least one embodiment, a polar aprotic solvent is present in the formulation of the present disclosure in an amount of about 46.3% by weight. In at least one embodiment, a polar aprotic solvent is present in the formulation of the present disclosure in an amount of about 46.7% by weight. In at least one embodiment, a polar aprotic solvent is present in the formulation of the present disclosure in an amount of about 47.1% by weight. In at least one embodiment, a polar aprotic solvent is present in the formulation of the present disclosure in an amount of about 47.3% by weight. In at least one embodiment, a polar aprotic solvent is present in the formulation of the present disclosure in an amount of about 48.2% by weight. In at least one embodiment, a polar aprotic solvent is present in the formulation of the present disclosure in an amount of about 48.8% by weight. In at least one embodiment, a polar aprotic solvent is present in the formulation of the present disclosure in an amount of about 49.3% by weight. In at least one embodiment, a polar aprotic solvent is present in the formulation of the present disclosure in an amount of about 49.6% by weight. In at least one embodiment, a polar aprotic solvent is present in the formulation of the present disclosure in an amount of about 49.9% by weight. In at least one embodiment, a polar aprotic solvent is present in the formulation of the present disclosure in an amount of about 50.2% by weight. In at least one embodiment, a polar aprotic solvent is present in the formulation of the present disclosure in an amount of about 50.7% by weight. In at least one embodiment, a polar aprotic solvent is present in the formulation of the present disclosure in an amount of about 51.0% by weight. In at least one embodiment, a polar aprotic solvent is present in the formulation of the present disclosure in an amount of about 51.3% by weight. In at least one embodiment, a polar aprotic solvent is present in the formulation of the present disclosure in an amount of about 51.6% by weight. In at least one embodiment, a polar aprotic solvent is present in the formulation of the present disclosure in an amount of about 53.6% by weight. In at least one embodiment, a polar aprotic solvent is present in the formulation of the present disclosure in an amount of about 54.2% by weight. In at least one embodiment, a polar aprotic solvent is present in the formulation of the present disclosure in an amount of about 55.0% by weight. In at least one embodiment, a polar aprotic solvent is present in the formulation of the present disclosure in an amount of about 55.6% by weight.

The formulations of the present disclosure also may optionally include a glycol and/or glycol derivative. Examples of glycols include, but are not limited to, ethylene glycol (commonly referred to as glycol), propylene glycol (PG) (1,2-propanediol), 1,4-butanediol, 1,5-pentanediol, 1,6-hexanediol, 1,10-decanediol, 1,7-heptanediol, 1,9-nonanediol, 1,8-octanediol, 1,3-propanediol, 1,3-butanediol, 1,4-butanediol, 2,3-butanediol, 2,4-pentanediol, 2,5-hexanediol, 4,5-octanediol, and 3,4-hexanediol. Other examples of glycols include, but are not limited to, diethylene glycol and dipropylene glycol.

Examples of glycol derivatives include, but are not limited to, ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol monon-butyl ether, ethylene glycol dimethyl ether, ethylene glycol diethyl ether, ethylene glycol dibutyl ether, ethylene glycol methyl ether acetate, ethylene glycol monoethyl ether acetate, ethylene glycol monobutyl ether acetate, propylene glycol methyl ether acetate, ethylene glycol monostearate, ethylene glycol distearate, ethylene glycol amido stearate, propylene glycol monostearate, propylene glycol dicaprylate, propylene glycol dicaprate diacetate glycol, dilaurate glycol, dipalmite glycol, diforrnate glycol, dibutyrate glycol, dibenzorate glycol, dipalmate glycol, dipropionate glycol, monoacetate glycol, monopalmitate glycol, monoformate glycol, and diethylene glycol monostearate. Examples of glycol derivatives also include, but are not limited to, $C_3$-$C_{12}$ triols and/or $C_3$-$C_{12}$ triol derivatives, including $C_3$-$C_6$ triols, glycerol monostearate, glycerol distearate, glycerol monooleate, glycerol monolaurate, glycerol dilaurate, glycerol dipalmitate, glycerol monopalmitate, glycerol triacetate, glycerol tribenzoate, glycerol tributyrate, glycerol trimyristate, glycerol trioleate, glycerol trilaurate, glycerol tripalmitate, and glycerol tristearate.

In at least one embodiment, the glycol and/or glycol derivative, such as for example, propylene glycol (PG), is present in the formulation of the present disclosure, in an amount of from about 1% to about 25% by weight of the total weight of the formulation, such as from about 1% to about 5%, such as from about 1% to about 10%, such as from about 1% to about 15%, such as from about 1% to about 20%. In at least one embodiment, the glycol and/or glycol derivative is present in the formulation of the present disclosure in an amount of about 8% to about 20%, such as from about 8% to about 9%, such as from about 9% to about 10%, such as from about 10% to about 11%, such as from about 11% to about 12%, such as from about 12% to about 13%, such as from about 13% to about 14%, such as from about 14% to about 15%, such as from about 15% to about 16%, such as from about 16% to about 17%, such as from about 17% to about 18%, such as from about 18% to about 19%, such as from about 19% to about 20%. In at least one embodiment, the glycol and/or glycol derivative is present in the formulation of the present disclosure in an amount of about 1.5% by weight. In at least one embodiment, the glycol and/or glycol derivative is present in the formulation of the present disclosure in an amount of about 4.0% by weight. In at least one embodiment, the glycol and/or glycol derivative is present in the formulation of the present disclosure in an amount of about 8.1% by weight. In at least one embodiment, the glycol and/or glycol derivative is present in the formulation of the present disclosure in an amount of about 8.4% by weight. In at least one embodiment, the glycol and/or glycol derivative is present in the formulation of the present disclosure in an amount of about 8.5% by weight. In at least one embodiment, the glycol and/or glycol derivative is present in the formulation of the present disclosure in an amount of about 11.0% by weight. In at least one embodiment, the glycol and/or glycol derivative is present in the formulation of the present disclosure in an amount of about 11.4% by weight. In at least one embodiment, the glycol and/or glycol derivative is present in the formulation of the present disclosure in an amount of about 11.6% by weight. In at least one embodiment, the glycol and/or glycol derivative is present in the formulation of the present disclosure in an amount of about 15.0% by weight. In at least one embodiment, the glycol and/or glycol derivative is present in the formulation of the present disclosure in an amount of about 15.1% by weight. In at least one embodiment, the glycol and/or glycol derivative is present in the formulation of the present disclosure in an amount of about 15.6% by weight. In at least one embodiment, the glycol and/or glycol derivative is present in the formulation of the present disclosure in an amount of about 15.9% by weight. In at least one embodiment, the glycol and/or glycol derivative is present in the formulation of the present disclosure in an amount of about 19.8% by weight. In at least one embodiment, the glycol and/or glycol derivative is present in the formulation of the present disclosure in an amount of about 20.1% by weight.

The formulations of the present disclosure also may optionally include an alkylene glycol alkyl ether. Examples of alkylene glycol alkyl ethers include, but are not limited to, diethylene glycol monoethyl ether, diethylene glycol monopropyl ether, diethylene glycol monopentylyl ether, diethylene glycol monoisopropyl ether, diethylene glycol monoisobutyl ether, diethylene glycol monohexyl ether, triethylene glycol monomethyl ether, triethylene glycol monopropyl ether, triethylene glycol monobuyl ether, triethylene glycol monopentyl ether, triethylene glycol monoisopropyl ether, triethylene glycol monoisobutyl ether, triethylene glycol monohexyl ether, tetraethylene glycol monomethyl ether, tetraethylene glycol monoethyl ether, tetraethylene glycol monopropyl ether, tetraethylene glycol monobutyl ether, tetraethylene glycol monopentyl ether, tetraethylene glycol monoisopropyl ether, tetraethylene glycol monoisobutyl ether, tetraethylene glycol monohexyl ether, dipropylene glycol monoethyl ether, dipropylene glycol monopropyl ether, dipropylene glycol monobutyl ether, dipropylene glycol monopentyl ether, dipropylene glycol monoisopropyl ether, dipropylene glycol monoisobutyl ether, dipropylene glycol monohexyl ether, tripropylene glycol monomethyl ether (MTPGE), tripropylene glycol monoethyl ether, tripropylene glycol monopropyl ether, tripropylene glycol monobutyl ether, tripropylene glycol monopentyl ether, tripropylene glycol monoisopropyl ether, tripropylene glycol monoisobutyl ether, tripropylene glycol monohexyl ether, triethylene glycol monobutyl ether (MTRGE), tetraethylene glycol monobutyl ether (MTEGE), diethylene glycol monobutyl ether (MDGE), and dipropylene glycol dimethyl ether (MDPG).

The formulations of the present disclosure may also optionally include combinations of at least two alkylene glycol alkyl ethers. Examples of commercially available alkylene glycol alkyl ethers include, but are not limited to, FLOMIN F672®, (a blend of ca. MW 250, methyl glycol ethers), FLOMIN F660® (a blend of triethylene glycol monobutyl ether 70-80%, tetraethylene glycol monobutyl ether 15-25%, diethylene glycol monobutyl ether <5%) and FLOMIN F661® (a mixture of triethylene glycol monoethyl ether and triethylene glycol monobutyl ether).

In at least one embodiment, the alkylene glycol alkyl ether, such as for example, triethylene glycol monobutyl ether, is present in the formulation of the present disclosure, in an amount of from about 0.1% to about 25% by weight of the total weight of the formulation, such as from about 0.1% to about 10%, such as from about 0.5 to about 5%, such as from about 5% to about 15%, such as from about 10% to about 20%, such as from about 15% to about 25%. In at least one embodiment, the alkylene glycol alkyl ether is present in the formulation of the present disclosure in an amount of about 0.1% to about 5%, such as from about 0.1% to about 1%, such as from about 1% to about 2%, such as from about 2% to about 3%, such as from about 3% to about 4%, or such as from about 4% to about 5%. The alkylene glycol alkyl ether may be present in the formulation of the present disclosure in an amount of about 15% to about 20%, such as from about 15% to about 16%, from about 16% to about 17%, from about 17% to about 18%, such as from about 18% to about 19%, or from about 19% to about 20%. In at least one embodiment, the alkylene glycol alkyl ether is present in the formulation of the present disclosure in an amount of about 0.6% by weight. In at least one embodiment, the alkylene glycol alkyl ether is present in the formulation of the present disclosure in an amount of about 0.9% by weight. In at least one embodiment, the alkylene glycol alkyl ether is present in the formulation of the present disclosure in an amount of about 4.1% by weight. In at least one embodiment, the alkylene glycol alkyl ether is present in the formulation of the present disclosure in an amount of about 4.2% by weight. In at least one embodiment, the alkylene glycol alkyl ether is present in the formulation of the present disclosure in an amount of about 4.3% by weight. In at least one embodiment, the alkylene glycol alkyl ether is present in the formulation of the present disclosure in an amount of about 16.8% by weight. In at least one embodiment, the alkylene glycol alkyl ether is present in the formulation of the present disclosure in an amount of about 17.4% by weight. In at least one embodiment, the alkylene glycol alkyl ether is present in the formulation of the present disclosure in an amount of about 17.7% by weight.

In certain embodiments, the solvent, or mixture of solvents, employed to combine the components can be selected from the group consisting of water (including buffered solutions, e.g., phosphate buffered solutions), glycols (e.g., propylene glycol), glycol derivatives and protected glycols (e.g., glycerol including protected glycerols such as isopropylidene glycerol, glycol ethers e.g. monoalkyl glycol ethers, dialkyl glycol ethers), acetonitrile, DMSO, alkanolamines (e.g., triethanolamine, diethanolamine, monoethanolamine, alkyldiethanolamines, dialkylmonoethanolamines, wherein the alkyl group can consist of methyl, ethyl, propyl, or any branched or unbranched alkyl chain), alkylsulfones (e.g., sulfolane), alkyl amides (e.g., N-2-methylpyrrolidone, N-2-butylpyrrolidone, N-2-ethylpyrrolidone, N,N-dimethylformamide, or any non-cyclic amide), monoalcohols (e.g., methanol, ethanol, propanol, isopropanol, benzyl alcohol. 2-ethylhexanol), dibasic esters and derivatives thereof, alkylene carbonates (e.g., ethylene carbonate, propylene carbonate), monobasic esters (e.g., ethyl lactate, ethyl acetate), carboxylic acids (e.g., maleic acid, oleic acid, itaconic acid, acrylic acid, methacrylic acid), phosphates (e.g., triethylphosphate), glycol esters, (−)-Dihydrolevoglucosenone (commercialized as CYRENE™) and/or surfactants (e.g. alkylbenzenesulfonates, alkyldiphenyloxide disulfonates, lignin sulfonates, alkylphenol ethoxylates, polyalkoxylated amines, TWEEN®, STEPAN, DOWFAX™, ECOSURF™) and combinations thereof. Further co-solvents, including but not limited to, liquid amides, 2-pyrrolidone, N-alkyl-2-pyrrolidones (e.g. N-ethylpyrrolidone, N-butylpyrrolidone), and ionic or non-ionic surfactants (e.g., alkylaryl polyether alcohols) can be used in certain embodiments.

The formulations of the present disclosure optionally include a dye. Examples of dyes include, but are not limited to, FD&C Blue No. 1, FD&C Blue No. 1, FD&C Green No. 3, FD&C Yellow No. 5, FD&C Red No. 3, FD&C Red No. 40, FD&C Yellow No. 6, and AGROTAIN® ULTRA green dye. In at least one embodiment, the dye, such as for example, AGROTAIN® ULTRA green dye, is present in the formulation of the present disclosure, in an amount of from about 0.01% to about 5% by weight of the total weight of the formulation. The dye may be present in the formulations of the present disclosure in an amount ranging from about 0.01% to about 5% by weight, such as from about 0.02% to about 5%, such as from about 0.05% to about 5%, such as from about 0.1% to about 5%, such as from about 0.5% to about 5%, such as from about 1% to about 5%, such as from about 2% to about 5%, such as from about 3% to about 5%, such as from about 4% to about 5%, such as from about 0.01% to about 2%, such as from about 0.05% to about 2%, such as from about 0.1% to about 2%, such as from about 0.5% to about 2%, such as from about 1% to about 2%, such as from about 0.01% to about 1%, such as from 0.05% to 1%, such as from 0.1% to 1%, such as from 0.5% to 1%. In at least one embodiment, the dye is present in the formulation of the present disclosure in an amount of about 0.57% by weight. In at least one embodiment, the dye is present in the formulation of the present disclosure in an amount of about 0.60% by weight. In at least one embodiment, the dye is present in the formulation of the present disclosure in an amount of about 0.61% by weight. In at least one embodiment, the dye is present in the formulation of the present disclosure in an amount of about 0.62% by weight.

In the formulations of the present disclosure, the weight ratio of NBPT to water is from about 1.8:1 to about 6.0:1, such as from about 1.9:1 to about 5.9:1, such as from about 2.0:1 to about 5.8:1, such as from about 2.1:1 to about 5.7:1, such as from about 2.2:1 to about 5.6:1, such as from about 2.3:1 to about 5.5:1, such as from about 2.4:1 to about 5.4:1, such as from about 2.5:1 to about 5.3:1, such as from about 2.6:1 to about 5.2:1, such as from about 2.7:1 to about 5.1:1, such as from about 2.8:1 to about 5.0:1, such as from about 2.9:1 to about 4.9:1, such as from about 3.0:1 to about 4.8:1, such as from about 3.1:1 to about 4.7:1, such as from about 3.2:1 to about 4.6:1, such as from about 3.3:1 to about 4.7:1, such as from about 3.4:1 to about 4.6:1, such as from about 3.5:1 to about 4.5:1, such as from about 3.6:1 to about 4.4:1, such as from about 3.6:1 to about 4.3:1, such as from about 3.5:1 to about 4.2:1. In at least one embodiment, the weight ratio of NBPT to water is about 2.7:1. In at least one embodiment, the weight ratio of NBPT to water is about 3.3:1. In at least one embodiment, the weight ratio of NBPT to water is about 3.9:1. In at least one embodiment, the weight ratio of NBPT to water is about 4:1. In at least one embodiment, the weight ratio of NBPT to water is about 4.5:1. In at least one embodiment, the weight ratio of NBPT to water is about 4:1. In at least one embodiment, the weight ratio of NBPT to water is about 4:1.

In the formulations of the present disclosure, the weight ratio of a polar aprotic solvent to glycol and/or a glycol derivative to alkylene glycol alkyl ether to water is from about 55:4:1:7 to about 70:40:1:18. In at least one embodiment, the weight ratio of a polar aprotic solvent to glycol and/or a glycol derivative to alkylene glycol alkyl ether to water is about 66:33:1:15. In at least one embodiment, the weight ratio of a polar aprotic solvent to glycol and/or a glycol derivative to alkylene glycol alkyl ether to water is about 67:33:1:13. The weight ratio of a polar aprotic solvent to glycol and/or a glycol derivative to alkylene glycol alkyl ether to water in the formulation of the present disclosure is from about 8:2:1:5 to about 12:6:1:1. In at least one embodiment, the weight ratio of a polar aprotic solvent to glycol and/or a glycol derivative to alkylene glycol alkyl ether to water is about 10:4:1:3. In at least one embodiment, the weight ratio of a polar aprotic solvent to glycol and/or a glycol derivative to alkylene glycol alkyl ether to water is about 10:4:1:2. The weight ratio of a polar aprotic solvent to glycol and/or a glycol derivative to alkylene glycol alkyl ether to water in the formulation of the present disclosure is from about 83:21:1:20 to about 75:16:1:11. In at least one embodiment, the weight ratio of a polar aprotic solvent to glycol and/or a glycol derivative to alkylene glycol alkyl ether to water is about 77:18:1:18. In at least one embodiment, the weight ratio of a polar aprotic solvent to glycol and/or a glycol derivative to alkylene glycol alkyl ether to water is about 80:19:1:15. In at least one embodiment, the weight ratio of a polar aprotic solvent to glycol and/or a glycol derivative to alkylene glycol alkyl ether to water is about 80:19:1:13. The weight ratio of a polar aprotic solvent to glycol and/or a glycol derivative to alkylene glycol alkyl ether to water in the formulation of the present disclosure is from about 4.5:1:2.5:2 to about 3.5:1:1.5:0.5. In at least one embodiment, the weight ratio of a polar aprotic solvent to glycol and/or a glycol derivative to alkylene glycol alkyl ether to water is about 4:1:2:1.5. In at least one embodiment, the weight ratio of a polar aprotic solvent to glycol and/or a glycol derivative to alkylene glycol alkyl ether to water is about 4:1:2:1. In at least one embodiment, the weight ratio of a polar aprotic solvent to glycol and/or a glycol derivative to alkylene glycol alkyl ether to water is about 49:4:1:9. In at least one embodiment, the weight ratio of a polar aprotic solvent to glycol and/or a glycol derivative to alkylene glycol alkyl ether to water is about 50:4:1:8. In at least one embodiment, the weight ratio of a polar aprotic solvent to glycol and/or a glycol derivative to alkylene glycol alkyl ether to water is about 46:6:1:8.

In the formulations of the present disclosure, the weight ratio of a polar aprotic solvent to glycol and/or a glycol derivative to water is from about 56:0:8 to about 12:1:2. In at least one embodiment, the weight ratio of a polar aprotic solvent to glycol and/or a glycol derivative to water is about 54:0:9. In at least one embodiment, the weight ratio of a polar aprotic solvent to glycol and/or a glycol derivative to water is about 55:0:8. In at least one embodiment, the weight ratio of a polar aprotic solvent to glycol and/or a glycol derivative to water is about 56:0:8. In at least one embodiment, the weight ratio of a polar aprotic solvent to glycol and/or a glycol derivative to water is about 50:0:9. In at least one embodiment, the weight ratio of a polar aprotic solvent to glycol and/or a glycol derivative to water is about 51:0:8. In at least one embodiment, the weight ratio of a polar aprotic solvent to glycol and/or a glycol derivative to water is about 49:0:9. In at least one embodiment, the weight ratio of a polar aprotic solvent to glycol and/or a glycol derivative to water is about 51:0:8. In at least one embodiment, the weight ratio of a polar aprotic solvent to glycol and/or a glycol derivative to water is about 12:1:2. In at least one embodiment, the weight ratio of a polar aprotic solvent to glycol and/or a glycol derivative to water is about 13:1:1. In at least one embodiment, the weight ratio of a polar aprotic solvent to glycol and/or a glycol derivative to water is about 11:1:2. In at least one embodiment, the weight ratio of a polar aprotic solvent to glycol and/or a glycol derivative to water is about 12:1:1. In at least one embodiment, the weight ratio of a polar aprotic solvent to glycol and/or a glycol derivative to water is about 13:1:2.

In some embodiments, the formulations of the present disclosure contain a water-soluble agent, such as for example a bio-fertilizer. In at least one embodiment, the water-soluble agent is a microbial strain from one or more microbial species. Examples of microbial species include but are not limited to the following group:
  i) Spore forming species of bacteria;
  ii) Spore forming species of fungi;
  iii) Mycorrhizal organisms including Laccaria bicolor, *Glomus intraradices*, and *Amanita* species;
  iv) *Actinomyces* species and strains thereof, including *Streptomyces lydicus*, *Streptomyces griseoviridis*, *Streptomyces griseoviridis* K61 (Mycostop; AgBio development), and *Streptomyces microflavus* AQ 6121;
  v) *Bacillus* species and strains thereof, including: *Bacillus itcheniformis; Bacillus megaterium; Bacillus pumilus, Bacillus amyloliquefaciens, Bacillus licheniformis; Bacillus oleronius; Bacillus megaterium; Bacillus mojavensis; Bacillus pumilus; Bacillus subtilis; Bacillus circulans; Bacillus globisporus; Bacillus firmus, Bacillus thuringiensis, Bacillus cereus, Bacillus amyloliquefaciens* strain D747 (Double Nickel; Certis), *Bacillus firmus* strain I-1582 (Votivo and Nortica; Bayer), *Bacillus licheniformis, Bacillus licheniformis* strain SB3086 (EcoGuard; Novozymes), *Bacillus pumilus* strain GB34 (YieldShield; Bayer), QST2808 (Sonata; Bayer), *Bacillus subtilis* strains GB03 (Kodiak; Bayer), MBI 600 (Subtilex; Becker Underwood) & QST 713 (Serenade; Bayer), *Bacillus subtilis* strain GB122 plus *Bacillus amyloliquefaciens* strain GB99 (BioYield; Bayer), *Bacillus pumilus* strain BU F-33, *Bacillus thuringiensis galleriae* strain SDS-502, *Bacillus thuringiensis* kurstaki, VBTS 2546, *Bacillus cereus* BP01, *Bacillus subtilis* strain EB120, *Bacillus subtilis* strain J-P13, *Bacillus subtilis* FB17, *Bacillus subtilis* strains QST30002 and QST3004 (NRRL B-50421 and NRRLB-50455), *Bacillus subtilis* strains QST30002 and QST3004 (NRRL B-50421 and NRRLB-50455) sandpaper mutants, *Bacillus thuringiensis* subsp kurstaki strain VBTS 2477 quadruple enterotoxindeficient mutants, *Bacillus simplex* strains 03WN13, 03WN23 and 03WN25, *Bacillus subtilis* strain QST 713, *Bacillus mycoides* isolate BmJ NRRL B-30890, *Bacillus subtilis* strain DSM 17231 and *Bacillus licheniformis* strain DSM17236, *Bacillus aryabhattai, Bacillus flexus, Bacillus nealsonii, Bacillus sphaericus, Bacillus megaterium, Bacillus vallismortis, Bacillus amyloliquefaciens* (ATCC 23842), *Bacillus licheniformis* (ATCC 14580), *Bacillus licheniformis* (B-642), *Bacillus licheniformis* (B-14368), *Bacillus thuringiensis* (ATCC 10792), *Bacillus thuringiensis* (HD-17), *Bacillus thuringiensis* (HD-1), and *Bacillus pumilus* (NRS-272);
  vi) Species of "Plant Growth Promoting Rhizobacteria" (PGPRs) and strains thereof, including species reported to be capable of nitrogen fixation, for example *Gluconacetobacter* species (e.g. *Gluconacetobacter diazotrophicus* a.k.a. *Acetobacter diazotrophicus*), *Spirillum* species (e.g. *Spirillum lipoferum*), *Azospirillum* species, *Herbaspirillum seropedicae, Azoarcus* species, *Azotobacter* species, *Burkholderia* species, *Burkholderia* sp. A396, and *Paenibacillus polymyxa;*
  vii) N-fixing bacterial species and strains thereof, including *Rhizobium* species (e.g. *Bradyrhizobium* species such as *Bradyrhizobium japonicum*, and *Rhizobium meliloti*);
  viii) Microbial species and strains thereof that are known to improve nutrient use efficiency, including *Penicillium* species (e.g. *Penicillium bilaii, Penicillium bilaji*), and *Mesorhizobium cicero;*
  ix) Microbial species and strains thereof that are known to have insecticidal or insect repellent effects including *Telenomus podisi, Baculovirus anticarsia; Trichogramma pretiosum, Trichogramma galloi, Chromobacterium subtsugae, Trichoderma* fertile JM41R, *Beauveria bassiana, Beauveria bassiana* strain NRRL 30976, *Beauveria bassiana* strain ATP02, DSM 24665, *Paecilomyces fumosoroseus, Trichoderma harzianum, Verticillium lecanii, Isaria fumosorosea* CCM 8367

(CCEFO.011.PFR), *Lecanicillium muscarium, Streptomyces microflavus*, and *Muscodor albus*;

x) Microbial species and strains thereof that are known to have nematicidal effects e.g. *Myrothecium verrucaria, Pasteuria* species and strains thereof including *Pasteuria nishizawae, Pasteuria reneformis* strain Pr-3, *Paecilomyces lilacinus, Chromobacterium subtsugae, Pasteuria* strain ATCC SD-5832, *Metarhizium* species, and *Flavobacterium* species;

xi) Microbial species and strains thereof that are known to have antifungal, antimicrobial and/or plant growth promoting effects e.g. *Gliocladium* species, *Pseudomonas* species (e.g. *Pseudomonas fluorescens, Pseudomonas fluorescens* D7, *Pseudomonas putida* and *Pseudomonas chlororaphis*), *Pseudomonas fluorescens* strain NRRL B-21133, NRRL B-21053 or NRRL B-21102, *Pseudomonas fluorescens* VP5, *Pseudomonas synxantha, Pseudomonas diazotrophicus, Enterobacter cloacae* strain NRRL B-21050, *Trichoderma* species, *Trichoderma virens, Trichoderma atroviride* strains, *Coniothyrium minitans, Gliocladium species, Gliocladium virens, Gliocladium roseum* strain 321U, *Trichoderma harzianum* species, *Trichoderma harzianum Rifai, Clonostachys rosea* strain 88-710, *Pseudomonas rhodesiae* FERM BP-10912, *Serratia plymuthica* CCGG2742, *Cryptococcus lavescens* strain OH 182.9, *Serratia plymuthica, Cladosporium cladosporioides, Mitsuaria* species, *Coprinus curtus, Virgibacillus halophilus, Saccharomyces* species, *Metschnikovia fruticola, Candida oleophila, Acremonium* species, *Pseudozyma aphidis, Pythium oligandrum, Phoma* spp strain I-4278, *Achromobacter* species, *Geomyces* species, *Pseudomonas azotoformans*, strain F30A, *Brevibacillus parabrevis* strain No 4; non-toxigenic *Aspergillus* strains NRRL 50427, NRRL 50428, NRRL 50429, NRRL 50430 and NRRL 50431, *Sphaerodes mycoparasitica* strains IDAC 301008-01, -02, or -03, *Muscodor albus* strain NRRL 30547 or NRRL30548, *Serratia plymuthica* CCGG2742, *Pseudomonas koreensis* strain 101L21, *Pseudomonas lini* strain 131L01, *Pantoea agglomerans* strain 101L31, *Streptomyces scopuliridis* strain RB72, *Acremonium* spp endophytes, *Streptomyces* spp BG76 strain, *Paracoccus kondratievae, Enterobacter cloacae, Cryptococcus flavescens, Lactobacillus parafarraginis, Lactobacillus buchneri, Lactobacillus rapi* or *Lactobacillus zeae, Paenibacillus polymyxa, Serratia plymuthica, Phoma species, Pythium oligandrum, Mycosphaerella* species, and *Variovorax* species;

xii) Bacterial species and strains thereof from the group termed Pink-Pigmented Facultative Methylotrophs (PPFMs) including *Methylobacterium* species; and xiii) Microbial species and strains thereof that are known to have herbicidal effect e.g., *Pyrenophora semeniperda*.

The formulation of the present disclosure may also include one or more excipients or additives. The excipient may be a surfactant, a solvent, or any combination thereof. In at least one embodiment, the surfactant is selected from octylphenol polyether alcohol, sulfosuccinate, naphthalene sulfonate, sulfated ester, phosphate ester, sulfated alcohol, alkyl benzene sulfonate, polycarboxylate, naphthalene sulfonate condensate, phenol sulfonic acid condensate, lignosulfonate, methyl oleyl taurate, polyvinyl alcohol, or any combination thereof. In at least one embodiment, the solvent is selected from benzyl alcohol, dimethyl sulfoxide (DMSO), morpholine, and ethoxylated amines.

The present disclosure also provides a process of preparing a formulation according to the present disclosure. The process for preparing a formulation according to the present disclosure comprises mixing a concentrate comprising N-(n-butyl) thiophosphoric triamide (NBPT); a polar aprotic solvent; optionally a glycol and/or a glycol derivative; optionally an alkylene glycol alkyl ether; and optionally a dye; and adding water, wherein the water optionally comprises a water-soluble agent.

More specifically, the present disclosure provides an NBPT concentrate comprising:
i) N-(n-butyl) thiophosphoric triamide (NBPT) in an amount ranging from about 37% to about 60% by weight;
ii) optionally a glycol and/or a glycol derivative in an amount ranging from about 0% to about 2% by weight;
iii) optionally an alkylene glycol alkyl ether in an amount ranging from about 0.5% to about 20% by weight; and
iv) a polar aprotic solvent in an amount ranging from about 40% to about 70% by weight;
wherein each component is present in amount by weight of the total formulation.

In at least one embodiment, the NPBT concentrate of the present disclosure comprises NBPT in an amount of about 41.06% by weight; a glycol and/or a glycol derivative in an amount of about 1.2% by weight; an alkylene glycol alkyl ether in an amount of about 5.47% by weight; and a polar aprotic solvent in an amount of about 52.27% by weight. In at least one embodiment, the concentrate comprises NBPT in an amount of about 38.92% by weight; a glycol and/or a glycol derivative in an amount of about 1.14% by weight; an alkylene glycol alkyl ether in an amount of about 0.69% by weight; and a polar aprotic solvent in an amount of about 59.16% by weight. In at least one embodiment, the concentrate comprises NBPT in an amount of about 37.55% by weight; a glycol and/or a glycol derivative in an amount of about 1.1% by weight; an alkylene glycol alkyl ether in an amount of about 20.69% by weight; and a polar aprotic solvent in an amount of about 40.67% by weight. In at least one embodiment, the concentrate comprises NBPT in an amount of about 43.33% by weight; an alkylene glycol alkyl ether in an amount of about 1.52% by weight; and a polar aprotic solvent in an amount of about 55.15% by weight. In at least one embodiment, the concentrate comprises NBPT in an amount of about 42.90% by weight; a glycol and/or a glycol derivative in an amount of about 0.99% by weight; an alkylene glycol alkyl ether in an amount of about 1.50% by weight; and a polar aprotic solvent in an amount of about 69.08% by weight. In at least one embodiment, the concentrate comprises NBPT in an amount of about 42.68% by weight; a glycol and/or a glycol derivative in an amount of about 1.50% by weight; an alkylene glycol alkyl ether in an amount of about 1.5% by weight; and a polar aprotic solvent in an amount of about 54.33% by weight. In at least one embodiment, the concentrate comprises NBPT in an amount of about 41.55% by weight; an alkylene glycol alkyl ether in an amount of about 1.5% by weight; and a polar aprotic solvent in an amount of about 56.95% by weight. In at least one embodiment, the concentrate comprises NBPT in an amount of about 41.17% by weight; a glycol and/or a glycol derivative in an amount of about 0.96% by weight; an alkylene glycol alkyl ether in an amount of about 1.44% by weight; and a polar aprotic solvent in an amount of about 56.43% by weight. In at least one embodiment, the concentrate comprises NBPT in an amount of about 40.97% by weight; a glycol and/or a glycol derivative in an amount of about 1.44% by weight; an alkylene glycol alkyl ether in an amount of about 1.44% by weight; and a polar aprotic solvent in an amount of about 56.16% by weight.

The present disclosure also includes methods for fertilizing soil. In at least one embodiment, the soil may be treated by contacting it directly with a formulation of the present disclosure. In at least one embodiment, contacting the soil with a formulation of the present disclosure may comprise administering a formulation of the present disclosure as a spray. In another embodiment, contacting the soil with a formulation of the present disclosure may comprise administering a formulation of the present disclosure as granules. In at least one embodiment, contacting the soil comprises administering a formulation of the present disclosure as a powder. In at least one embodiment, contacting the soil comprises adding a formulation of the present disclosure to the irrigation water for the soil. In at least one embodiment, promoting plant growth, plant productivity, and/or soil quality comprising applying an effective amount of a formulation of the present disclosure to a plant, plant part, plant seed, and/or soil.

The formulations of the present disclosure are stable and resist freezing and crystallization at low temperatures, such as at 0° C. or below. The formulations of the present disclosure are stable at such low temperatures for extended periods of time, including for example, during storage. In other words, the formulations of the present disclosure remain in liquid form at low temperatures and/or for extended periods of time, such as for example, at least 2 weeks, at least one month, at least 6 months, at least one year, or at least 1.5 years.

The formulations of the present disclosure are stable, meaning they exhibit substantially no freezing of the formulation and/or crystallization, such that less than about 5% of the total solution is frozen and/or less than about 5% of total solids crystallize out from solution at a temperature of 0° C. or below.

As will be apparent to those of ordinary skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other acceptable order.

EXAMPLES

Comparative Example 1

A commercially available solution containing N-(n-butyl)-thiophosphoric triamide (15-40 wt %) in propylene glycol (40-70 wt %), N-methyl-2-pyrrolidinone (10-30 wt %) and other components (0-5 wt %) was used. In a glass vessel, a stir bar and 7 parts (by volume ratio) of the NBPT stock solution were added to 1 part (by volume ratio) of water. The mixture was placed on a stir plate and was stirred at room temperature (~22° C.) to ensure homogeneity. Following this general procedure, Comparative Formulations 1A-1K were prepared as shown in Table 1 below.

TABLE 1

| Formulation Entry | Stock solution (% w/w) | Water (% w/w) | 0° C. stability |
|---|---|---|---|
| 1A | 87.5 | 12.5 | Crystallization observed ≤27 days |
| 1B | 88.2 | 11.8 | Crystallization observed ≤27 days |
| 1C | 88.9 | 11.1 | Crystallization observed ≤27 days |
| 1D | 90.5 | 10.5 | Crystallization observed ≤27 days |
| 1E | 90 | 10 | Crystallization observed ≤27 days |
| 1F | 90.5 | 9.5 | Crystallization observed ≤27 days |
| 1G | 90.9 | 9.1 | Crystallization observed ≤27 days |
| 1H | 91.3 | 8.7 | Crystallization observed ≤27 days |
| 1I | 91.7 | 8.3 | Crystallization observed ≤27 days |
| 1J | 92.0 | 8.0 | Crystallization observed ≤27 days |

The aqueous formulations shown in Table 1 above were tested for their stability at 0° C. As shown, crystallization was observed within 27 days at 0° C. for each of the formulations in Table 1.

Comparative Example 2

Another commercially available solution containing N-(n-butyl)-thiophosphoric triamide (15-40 wt %) in propylene glycol (10-30 wt %), N-methyl-2-pyrrolidinone (15-40 wt %), triethylene glycol monobutyl ether (<6 wt %), tetraethylene glycol monobutyl ether (<2 wt %), diethylene glycol monobutyl ether (<0.5 wt %), triethylene glycol (<0.1 wt %), and other components (0-5% wt) was used. In a glass vessel, 5.3 parts (by volume ratio) of the stock solution were added to 1 part (by volume ratio) of water. The mixture was stirred at room temperature (~22° C.) to ensure homogeneity. The resulting formulation was tested for its stability at 0° C. and −15° C. The aqueous formulation either froze or showed crystallization and/or precipitation of solid within 15 days at 0° C. and after 1 day at −15° C.

Additional comparative liquid formulations comprising NBPT, a glycol and/or a glycol derivative, an alkylene glycol alkyl ether, N-methyl-2-pyrrolidinone (NMP), and water were also prepared from NBPT concentrates. The composition of the comparative NBPT concentrates is shown in Table 2.

TABLE 2

| Concentrate | NBPT (% w/w) | NMP (% w/w) | Propylene Glycol (% w/w) | Glycol ether (% w/w) | Dye (% w/w) |
|---|---|---|---|---|---|
| 2A | 30.60 | 29.13 | 14.60 | 25.00 | 0.67 |
| 2B | 37.80 | 49.26 | 12.52 | 0.89 | 0.67 |
| 2C | 37.80 | 26.08 | 13.07 | 22.38 | 0.67 |
| 2D | 37.76 | 41.05 | 16.72 | 4.47 | 0 |
| 2E | 37.50 | 40.80 | 16.60 | 4.50 | 0.67 |

TABLE 2-continued

| Concentrate | NBPT (% w/w) | NMP (% w/w) | Propylene Glycol (% w/w) | Glycol ether (% w/w) | Dye (% w/w) |
|---|---|---|---|---|---|
| 2F | 30.60 | 45.82 | 18.58 | 5.00 | 0 |
| 2G | 30.60 | 45.03 | 23.37 | 1.00 | 0 |
| 2H | 30.30 | 44.70 | 23.20 | 1.00 | 0.67 |
| 2I | 37.80 | 40.34 | 20.99 | 0.89 | 0 |
| 2J | 37.50 | 40.30 | 20.80 | 0.80 | 0.67 |
| 2K | 34.25 | 42.95 | 21.48 | 0.65 | 0.67 |
| 2L | 34.25 | 40.35 | 20.17 | 4.56 | 0.67 |
| 2M | 33.38 | 40.89 | 20.44 | 4.62 | 0.67 |
| 2N | 33.26 | 40.96 | 20.49 | 4.62 | 0.67 |
| 2O | 34.25 | 43.60 | 20.28 | 1.20 | 0.67 |
| 2P | 34.25 | 46.95 | 16.93 | 1.20 | 0.67 |

In a glass vessel, the above concentrates were added to water in a volume ratio shown in Table 3 below. Each mixture was stirred at room temperature (~22° C.) to ensure homogeneity. The resulting formulations were tested for their stability at 0° C. and −15° C. The aqueous formulations either froze or showed crystallization and/or precipitation of solid at 0° C. or below after being stored at 0° C. or below for at least 1 day as shown in Table 3. In the tables herein, "n.d." means not determined.

TABLE 3

| Comparative Formulation | NBPT Concentrate (parts by volume) | Water (part by volume) | 0° C. stability | −15° C. stability |
|---|---|---|---|---|
| 2AA | 6 parts 2A | 1 part | Crystallization observed ≤3 days | Crystallization observed ≤0 day |
| 2BB | 6 parts 2B | 1 part | Crystallization observed ≤3 days | Crystallization observed ≤0 day |
| 2CC | 6 parts 2C | 1 part | Crystallization observed ≤3 days | Crystallization observed ≤0 day |
| 2DD | 6 parts 2D | 1 part | Crystallization observed ≤0 day | n.d. |
| 2EE | 6 parts 2E | 1 part | Crystallization observed ≤0 day | n.d. |
| 2FF | 6 parts 2F | 1 part | Crystallization observed ≤4 day | n.d. |
| 2GG | 6 parts 2G | 1 part | Crystallization observed ≤0 day | n.d. |
| 2HH | 6 parts 2H | 1 part | Crystallization observed ≤4 day | n.d. |
| 2II | 6 parts 2I | 1 part | Crystallization observed ≤0 day | n.d. |
| 2JJ | 6 parts 2J | 1 part | Crystallization observed ≤0 day | n.d. |
| 2KK | 8 parts 2K | 1 part | Crystallization observed ≤3 days | n.d. |
| 2LL | 8 parts 2L | 1 part | Crystallization observed ≤3 days | n.d. |
| 2MM | 10 parts 2M | 1 part | Crystallization observed ≤5 days | n.d. |
| 2NN | 12 parts 2N | 1 part | Crystallization observed ≤5 days | n.d. |
| 2OO | 8 parts 2O | 1 part | Crystallization observed ≤3 days | n.d. |
| 2PP | 8 parts 2P | 1 part | Crystallization observed ≤3 days | n.d. |

The final composition of each formulation (2AA-2PP) is described in Table 4 below.

TABLE 4

| Formulation Entry | NBPT (% w/w) | NMP (% w/w) | Propylene Glycol (% w/w) | Glycol Ether (% w/w) | Dye (% w/w) | Water (% w/w) |
|---|---|---|---|---|---|---|
| 2AA | 26.22 | 24.94 | 1.51 | 21.43 | 0.57 | 14.28 |
| 2BB | 32.39 | 42.22 | 13.03 | 0.76 | 0.57 | 14.28 |
| 2CC | 32.39 | 22.35 | 11.20 | 19.18 | 0.57 | 14.28 |
| 2DD | 32.36 | 35.18 | 14.32 | 3.83 | 0.0 | 14.28 |
| 2EE | 32.14 | 34.97 | 14.22 | 3.85 | 0.57 | 14.28 |
| 2FF | 26.22 | 39.27 | 15.92 | 4.29 | 0.0 | 14.28 |
| 2GG | 26.22 | 38.59 | 20.03 | 0.86 | 0.0 | 14.28 |
| 2HH | 25.97 | 38.31 | 19.88 | 0.86 | 0.57 | 14.28 |
| 2II | 32.36 | 34.57 | 17.99 | 0.76 | 0.0 | 14.28 |
| 2JJ | 32.14 | 34.54 | 17.83 | 0.69 | 0.57 | 14.28 |
| 2KK | 30.45 | 38.18 | 19.09 | 0.58 | 0.60 | 11.2 |
| 2LL | 30.45 | 35.87 | 17.93 | 4.05 | 0.60 | 11.2 |
| 2MM | 30.34 | 37.17 | 18.58 | 4.20 | 0.61 | 9.0 |
| 2NN | 30.70 | 37.81 | 18.91 | 4.26 | 0.62 | 7.7 |
| 2OO | 30.45 | 38.76 | 18.03 | 1.07 | 0.60 | 11.1 |
| 2PP | 30.45 | 41.74 | 15.05 | 1.07 | 0.60 | 11.1 |

Additional comparative formulations containing a dye were formulated and tested for stability as shown in Table 5.

TABLE 5

| Entry | NBPT (% w/w) | Polar Aprotic Solvent (% w/w) | Propylene Glycol (% w/w) | Triethylene glycol monobutyl ether (% w/w) | Dye (% w/w) | Water (% w/w) | 0° C. Stability |
|---|---|---|---|---|---|---|---|
| 2QQ | 36.70 | 48.6 (butyl carbitol acetate) | 4.00 | 1.00 | 0.60 | 9.10 | Solution not homogenous; stability not tested |
| 2RR | 36.70 | 50.00 (butyl carbitol acetate) | 4.00 | 1.00 | 0.60 | 7.70 | Solution not homogenous; stability not tested |
| 2SS | 36.70 | 46.00 (butyl carbitol acetate) | 6.00 | 3.00 | 0.60 | 7.70 | Solution not homogenous; stability not tested |
| 2TT | 36.70 | 48.6 (DMF) | 4.00 | 1.00 | 0.60 | 9.10 | Crystallization observed ≤5 days |

Example 1: Aqueous Formulations from Commercially Available Solutions of NBPT

In a first example, the commercially available solution from Comparative Example 1 was used. In a glass vessel, a stir bar and 12 parts (by volume ratio) of the NBPT stock solution were added to 1 part (by volume ratio) of water. The mixture was placed on a stir plate and was stirred at room temperature (~22° C.) to ensure homogeneity. Formulation 1K comprised 92.3% w/w of the NBPT stock solution and 7.7% w/w of water and remained liquid beyond 28 days.

Example 2: Aqueous Formulations from Concentrates of NBPT

Low temperature stable, liquid formulations according to the present disclosure comprising NBPT, a glycol and/or a glycol derivative, an alkylene glycol alkyl ether, N-methyl-2-pyrrolidinone (NMP), and water were prepared from NBPT concentrates. NBPT concentrates may contain a high concentration of NPBT (for example >35% NBPT) in solvents, such as polar aprotic solvents, including but not limited to NMP, and optionally other solvents, including but not limited to propylene glycol and triethylene glycol monobutyl ether. Such concentrates are beneficial for transportation, packaging, storage and/or use in a fertilizer formulation. An operator can dilute the NBPT concentrate with additional agents, such as, for example, solvent(s) and a dye, which can be further formulated with water that optionally contains a water-soluble agent, such as a biological agent.

The concentrates in Table 6 below were prepared according to the following protocol. For Entry 1, NBPT (34.25 g, 98 wt % purity) was added to a mixture of propylene glycol (1.0 g), NMP (43.60 g), and triethylene glycol monobutyl ether (4.56 g). For Entry 2, NBPT (34.25 g, 98 wt % purity) was added to a mixture of propylene glycol (1.0 g), NMP (52.06 g), and triethylene glycol monobutyl ether (0.69 g). For Entry 3, NBPT (34.25 g, 98 wt % purity) was added to a mixture of propylene glycol (1.0 g), NMP (37.10 g), and triethylene glycol monobutyl ether (18.87 g). The remaining entries were prepared similarly in the ratios shown in the table below. The resulting mixtures were each placed on a stir plate and were stirred at room temperature (~22° C.) to ensure homogeneity.

The NBPT concentrates shown in Table 6 were evaluated based on their stability during storage. For example, small variations in the amounts of the glycol and/or a glycol derivative (such as the propylene glycol) or the amounts of the alkylene glycol alkyl ether or the amounts of the N-methyl-2-pyrrolidinone (NMP) were examined to determine concentrations at which no change in the color of the concentrate was observed over the course of storage. The concentrates in the table below were storage stable.

TABLE 6

| Concentrate Entry | NBPT (% w/w) | NMP (% w/w) | Propylene Glycol (% w/w) | Triethylene glycol monobutyl ether (% w/w) | Concentrate Color |
|---|---|---|---|---|---|
| 1 | 41.06 | 52.27 | 1.20 | 5.47 | Yellow tint |
| 2 | 38.92 | 59.16 | 1.14 | 0.69 | Yellow tint |
| 3 | 37.55 | 40.67 | 1.10 | 20.69 | Amber tint |
| 4 | 43.33 | 55.15 | 0 | 1.52 | Yellow tint |
| 5 | 42.90 | 69.08 | 0.99 | 1.50 | Yellow tint |
| 6 | 42.68 | 54.33 | 1.5 | 1.50 | Yellow tint |
| 7 | 41.55 | 56.95 | 0 | 1.50 | Yellow tint |
| 8 | 41.17 | 56.43 | 0.96 | 1.44 | Yellow tint |
| 9 | 40.97 | 56.16 | 1.44 | 1.44 | Yellow tint |

As discussed above, the NBPT concentrates according to the present disclosure can be further diluted with at least one dye and/or a solvent, such as an aprotic solvent, including but not limited to NMP, optionally a glycol and/or a glycol derivative, and/or optionally an alkylene glycol alkyl ether.

The concentrated NBPT solutions in Table 7 below were prepared from the concentrates described in Table 6.

TABLE 7

| Entry | Produced from Concentrate | NBPT (% w/w) | NMP (% w/w) | Propylene Glycol (% w/w) | Triethylene glycol monobutyl ether (% w/w) | Dye (% w/w) |
|---|---|---|---|---|---|---|
| 3A | 1 | 34.25 | 43.60 | 16.92 | 4.56 | 0.67 |
| 3B | 2 | 34.25 | 52.06 | 12.37 | 0.69 | 0.67 |
| 3C | 3 | 34.25 | 37.10 | 9.11 | 18.87 | 0.67 |

Alternatively, NBPT concentrates containing a dye can be formulated directly as shown in Table 8.

TABLE 8

| Entry | Produced from Concentrate | NBPT (% w/w) | Polar Aprotic Solvent (% w/w) | Propylene Glycol (% w/w) | Triethylene glycol monobutyl ether (% w/w) | Dye (% w/w) |
|---|---|---|---|---|---|---|
| 3D | n/a | 33.38 | 44.19 (NMP) | 17.15 | 4.62 | 0.67 |
| 3E | n/a | 33.26 | 44.27 (NMP) | 12.18 | 4.62 | 0.67 |
| 3F | n/a | 33.38 | 52.76 (NMP) | 12.37 | 0.69 | 0.67 |
| 3G | n/a | 33.26 | 52.86 (NMP) | 12.55 | 0.66 | 0.67 |
| 3H | n/a | 33.38 | 37.59 (NMP) | 9.23 | 19.13 | 0.67 |
| 3I | n/a | 33.26 | 37.66 (NMP) | 9.25 | 19.16 | 0.67 |
| 3J | n/a | 30.60 | 54.98 (NMP) | 12.75 | 1.00 | 0.67 |
| 3K | n/a | 30.30 | 45.50 (NMP) | 18.50 | 5.00 | 0.67 |
| 3L | n/a | 33.38 | 43.53 (NMP) | 21.76 | 0.66 | 0.67 |
| 3M | n/a | 33.26 | 43.61 (NMP) | 21.80 | 0.66 | 0.67 |

The NBPT concentrates in Tables 7 and 8 were formulated with water according to the ratios shown in Table 9. For example, an NPBT concentrate according to Tables 7 and 8 was used to produce a formulation comprising water by mixing 8, 10, or 12 parts (by volume ratio) of the stock solution to 1 part (by volume ratio) of water. The aqueous formulations described below were stirred at room temperature (~22° C.) to ensure homogeneity. The resulting formulations were tested for their stability at 0° C. for at least 1-40 days.

TABLE 9

| Formulation Entry | Stock Solution (parts by volume) | Water (part by volume) | 0° C. stability |
|---|---|---|---|
| 3AA | 8 parts 3A | 1 part | Stable liquid for at least 28 days |
| 3BB | 8 parts 3B | 1 part | Stable liquid for at least 28 days |
| 3CC | 8 parts 3C | 1 part | Stable liquid for at least 28 days |
| 3DD | 10 parts 3D | 1 part | Stable liquid for at least 28 days |
| 3EE | 12 parts 3E | 1 part | Stable liquid for at least 28 days |
| 3FF | 10 parts 3F | 1 part | Stable liquid for at least 28 days |
| 3GG | 12 parts 3G | 1 part | Stable liquid for at least 28 days |
| 3HH | 10 parts 3H | 1 part | Stable liquid for at least 28 days |
| 3II | 12 parts 3I | 1 part | Stable liquid for at least 28 days |
| 3JJ | 6 parts 3J | 1 part | Stable liquid for at least 28 days |

TABLE 9-continued

| Formulation Entry | Stock Solution (parts by volume) | Water (part by volume) | 0° C. stability |
|---|---|---|---|
| 3KK | 6 parts 3K | 1 part | Stable liquid for at least 28 days |
| 3LL | 10 parts 3L | 1 part | Stable liquid for at least 28 days |
| 3MM | 12 parts 3M | 1 part | Stable liquid for at least 28 days |

Additional formulations containing a dye can be formulated directly as shown in Table 10.

TABLE 10

| Entry | NBPT (% w/w) | Polar Aprotic Solvent (% w/w) | Propylene Glycol (% w/w) | Triethylene glycol monobutyl ether (% w/w) | Dye (% w/w) | Water (% w/w) | 0° C. stability |
|---|---|---|---|---|---|---|---|
| 4A | 36.70 | 48.60 (DMSO) | 4.00 | 1.00 | 0.60 | 9.10 | Stable liquid for at least 14 days |
| 4B | 36.70 | 50.00 (DMSO) | 4.00 | 1.00 | 0.60 | 7.70 | Stable liquid for at least 14 days |
| 4C | 36.70 | 46.00 (DMSO) | 6.00 | 3.00 | 0.60 | 7.70 | Stable liquid for at least 14 days |
| 4D | 36.70 | 50.00 (DMF) | 4.00 | 1.00 | 0.60 | 7.70 | Stable liquid for at least 14 days |
| 4E | 36.70 | 46.00 (DMF) | 6.00 | 3.00 | 0.60 | 7.70 | Stable liquid for at least 14 days |
| 4F | 36.70 | 53.60 (DMSO) | 0.00 | 0.00 | 0.60 | 9.10 | Stable liquid for at least 14 days |
| 4G | 36.70 | 55.00 (DMSO) | 0.00 | 0.00 | 0.60 | 7.70 | Stable liquid for at least 14 days |
| 4H | 36.70 | 49.60 (DMSO) | 4.00 | 0.00 | 0.60 | 9.10 | Stable liquid for at least 14 days |
| 4I | 36.70 | 51.00 (DMSO) | 4.00 | 0.00 | 0.60 | 7.70 | Stable liquid for at least 14 days |
| 4J | 41.00 | 49.30 (DMSO) | 0.00 | 0.00 | 0.60 | 9.10 | Stable liquid for at least 14 days |
| 4K | 41.00 | 50.70 (DMSO) | 0.00 | 0.00 | 0.60 | 7.70 | Stable liquid for at least 14 days |
| 4L | 41.00 | 45.30 (DMSO) | 4.00 | 0.00 | 0.60 | 9.10 | Stable liquid for at least 14 days |
| 4M | 41.00 | 46.70 (DMSO) | 4.00 | 0.00 | 0.60 | 7.70 | Stable liquid for at least 14 days |

Formulations without a dye can be also formulated directly as shown in Table 11.

TABLE 11

| Entry | NBPT (% w/w) | Polar Aprotic Solvent (% w/w) | Propylene Glycol (% w/w) | Water (% w/w) | 0° C. stability |
|---|---|---|---|---|---|
| 4N | 36.70 | 54.20 (DMSO) | 0.00 | 9.10 | Stable liquid for at least 14 days |
| 4O | 36.70 | 55.60 (DMSO) | 0.00 | 7.70 | Stable liquid for at least 14 days |
| 4P | 36.70 | 50.20 (DMSO) | 4.00 | 9.10 | Stable liquid for at least 14 days |
| 4Q | 36.70 | 51.60 (DMSO) | 4.00 | 7.70 | Stable liquid for at least 14 days |
| 4R | 41.00 | 49.90 (DMSO) | 0.00 | 9.10 | Stable liquid for at least 14 days |
| 4S | 41.00 | 51.30 (DMSO) | 0.00 | 7.70 | Stable liquid for at least 14 days |

TABLE 11-continued

| Entry | NBPT (% w/w) | Polar Aprotic Solvent (% w/w) | Propylene Glycol (% w/w) | Water (% w/w) | 0° C. stability |
|---|---|---|---|---|---|
| 4T | 41.00 | 45.90 (DMSO) | 4.00 | 9.10 | Stable liquid for at least 14 days |
| 4U | 41.00 | 47.30 (DMSO) | 4.00 | 7.70 | Stable liquid for at least 14 days |

The formulations (Examples 3AA-3 MM and 4A-4U) were placed in a sealed jar into a freezer that is set to the desired temperature (0° C.). The time when the sample is first placed into the freezing temperature is set to time zero. Samples are monitored daily for solidification by slowly tilting each container to observe for fluidity. Freezing time is based on the time at which a particular formulation appeared to be solidified. Formulations that appear to be solidified are removed to ambient temperature and allowed to thaw. Some samples that are frozen may re-solubilize when the temperature is brought to ambient conditions. Other samples that are frozen may remain as solid after elevating the temperature to ambient. The samples are kept at 0° C. for up to 35 days.

The final composition of each formulation (3AA-3 MM) is described in the Table 12 below.

TABLE 12

| Formulation Entry | NBPT (% w/w) | NMP (% w/w) | Propylene Glycol (% w/w) | Triethylene glycol monobutyl ether (% w/w) | Dye (% w/w) | Water (% w/w) |
|---|---|---|---|---|---|---|
| 3AA | 30.45 | 38.76 | 15.04 | 4.05 | 0.60 | 11.2 |
| 3BB | 30.45 | 46.28 | 11.00 | 0.61 | 0.60 | 11.2 |
| 3CC | 30.45 | 32.98 | 8.10 | 16.78 | 0.60 | 11.2 |
| 3DD | 30.30 | 40.17 | 15.59 | 4.20 | 0.61 | 9.0 |
| 3EE | 30.70 | 40.87 | 15.86 | 4.26 | 0.62 | 7.7 |
| 3FF | 30.34 | 48.15 | 11.39 | 0.60 | 0.61 | 9.0 |
| 3GG | 30.70 | 48.80 | 11.58 | 0.61 | 0.62 | 7.7 |
| 3HH | 30.30 | 34.44 | 8.39 | 17.39 | 0.61 | 9.0 |
| 3II | 30.70 | 34.76 | 8.54 | 17.70 | 0.62 | 7.7 |
| 3JJ | 26.22 | 47.11 | 1.50 | 0.86 | 0.57 | 14.28 |
| 3KK | 25.97 | 39.00 | 15.85 | 4.29 | 0.57 | 14.28 |
| 3LL | 30.70 | 39.57 | 19.78 | 0.60 | 0.61 | 9.0 |
| 3MM | 30.70 | 40.26 | 20.12 | 0.61 | 0.62 | 7.7 |

Example 3: Aqueous Formulations Comprising Microbial Species

The low temperature stable, liquid formulations according to the present disclosure above can also be formulated to contain a water-soluble agent, such as a microbial species. To a solution comprising NBPT, a glycol and/or a glycol derivative, an alkylene glycol alkyl ether, and a polar aprotic solvent, is added water comprising an agricultural microbial inoculant composition comprising at least one microbial strain from one or more microbial species.

All the formulations comprising a microbial species are prepared by a two-step method. First, selected agriculturally beneficial bacteria is grown overnight in Luria-Bertani (LB) medium at 37° C. with agitation. Growth is measured with a Bausch and Lomb Spectronic Spectrophotometer at 600 nm (OD600) to provide samples with cell optical density at 600 nm (OD600) between 1.2 and 1.5. The overnight cultures typically contain $1.6 \times 10^8$ to $3.4 \times 10^8$ colony forming units per mL (CFU/mL). Second, 1 pint (or 1 part per volume) of the prepared bacteria species sample in LB medium is added to 6 pints (or 6 parts per volume), 8 pints (or 8 parts per volume), 10 pints (or 10 parts per volume), or 12 pints (or 12 parts per volume) of an NBPT concentrate according to the present disclosure.

The microbial species that comprise the formulations are *Bacillus* strains, including but not limited to *Bacillus amyloliquefaciens* (ATCC 23842), *Bacillus licheniformis* (ATCC 14580), *Bacillus licheniformis* (B-642), *Bacillus licheniformis* (B-14368), *Bacillus thuringiensis* (ATCC 10792), *Bacillus thuringiensis* (HD-17), *Bacillus thuringiensis* (HD-1) and *Bacillus pumilus* (NRS-272).

We claim:

1. A formulation comprising:
   i) N-(n-butyl) thiophosphoric triamide (NBPT) in an amount ranging from about 25% to about 40% by weight;
   ii) water in an amount ranging from about 7% to about 25% by weight; and wherein the water optionally comprises a water-soluble agent; and
   iii) a polar aprotic solvent in an amount ranging from about 30% to about 50% by weight; and
   iv) a glycol and/or a glycol derivative in an amount ranging from about 1% to about 25% by weight; and/or
   v) an alkylene glycol alkyl ether in an amount ranging from about 0.1% to about 25% by weight;
   wherein each component is present in amount by weight of the total formulation;
   wherein the formulation is stable for at least 2 weeks at 0° C.

2. The formulation of claim 1, wherein the water comprises a water-soluble agent.

3. The formulation of claim 2, wherein the water-soluble agent is a biological agent.

4. The formulation of claim 3, wherein the biological agent is an agriculturally beneficial *Bacillus* species selected from the group of strains consisting of *Bacillus amyloliquefaciens* (ATCC 23842), *Bacillus licheniformis* (ATCC 14580), *Bacillus licheniformis* (B-642), *Bacillus licheniformis* (B-14368), *Bacillus thuringiensis* (ATCC 10792), *Bacillus thuringiensis* (HD-17), *Bacillus thuringiensis* (HD-1), *Bacillus pumilus* (NRS-272), and any combination thereof.

5. The formulation of claim 1, further comprising a dye.

6. The formulation of claim 1, wherein the polar aprotic solvent is selected from the group consisting of N-methyl-2-pyrrolidinone, dimethyl sulfoxide, dimethylformamide, and combinations thereof.

7. The formulation of claim 1, wherein the alkylene glycol alkyl ether is selected from the group consisting of diethylene glycol monoethyl ether, diethylene glycol monopropyl ether, diethylene glycol monopentyl ether, diethylene glycol monoisopropyl ether, diethylene glycol monoisobutyl ether, diethylene glycol monohexyl ether, triethylene glycol monomethyl ether, triethylene glycol monopropyl ether, triethylene glycol monobutyl ether, triethylene glycol monopentyl ether, triethylene glycol monoisopropyl ether, triethylene glycol monoisobutyl ether, triethylene glycol monohexyl ether, tetraethylene glycol monomethyl ether, tetraethylene glycol monoethyl ether, tetraethylene glycol monopropyl ether, tetraethylene glycol monobutyl ether, tetraethylene glycol monopentyl ether, tetraethylene glycol monoisopropyl ether, tetraethylene glycol monoisobutyl ether, tetraethylene glycol monohexyl ether, dipropylene glycol monoethyl ether, dipropylene glycol monopropyl ether, dipropylene glycol monobutyl ether, dipropylene glycol monopentyl ether, dipropylene glycol monoisopropyl ether, dipropylene glycol monoisobutyl ether, dipropylene glycol monohexyl ether, tripropylene glycol monoethyl ether, tripropylene glycol monopropyl ether, tripropylene glycol monobutyl ether, tripropylene glycol monopentyl ether, tripropylene glycol monoisopropyl ether, tripropylene glycol monoisobutyl ether, tripropylene glycol monohexyl ether, and combinations thereof.

8. The formulation of claim 1, wherein the weight ratio of NBPT to water is from about 1.8:1 to about 6.0:1.

9. The formulation of claim 1, wherein the weight ratio of polar aprotic solvent to glycol and/or glycol derivative to alkylene glycol alkyl ether to water is from about 60:30:1:10 to about 70:40:1:18.

10. The formulation of claim 1, wherein NBPT is present in an amount of about 26.22% by weight; a polar aprotic solvent is present in an amount of about 47.11% by weight; a glycol and/or a glycol derivative is present in an amount of about 1.5% by weight; an alkylene glycol alkyl ether is present in an amount of about 0.86% by weight; water is present in an amount of about 14.28% by weight; and a dye is present in an amount of about 0.57% by weight.

11. The formulation of claim 1, wherein the polar aprotic solvent is dimethyl sulfoxide.

12. A process of preparing a formulation of claim 1 comprising:
mixing a concentrate comprising the N-(n-butyl) thiophosphoric triamide (NBPT);
the glycol and/or the glycol derivative; the alkylene glycol alkyl ether; the polar aprotic solvent; and optionally a dye with the water, wherein the water optionally comprises a water-soluble agent.

13. A method for promoting plant growth, plant productivity, and/or soil quality comprising applying an effective amount of the formulation of claim 1 to a plant, plant part, plant seed, and/or soil.

14. An NBPT concentrate comprising:
i) N-(n-butyl) thiophosphoric triamide (NBPT) in an amount ranging from about 37% to about 60% by weight;
ii) a glycol and/or a glycol derivative in an amount ranging from about 0.2% to about 2% by weight;
iii) an alkylene glycol alkyl ether in an amount ranging from about 0.5% to about 20% by weight; and
iv) a polar aprotic solvent in an amount ranging from about 40% to about 70% by weight;
wherein each component is present in amount by weight of the total formulation.

15. The concentrate of claim 14, wherein the glycol is dipropylene glycol.

16. The concentrate of claim 14, wherein the alkylene glycol alkyl ether is monomethyl ether or triethylene glycol monopropyl ether.

17. The concentrate of claim 14, wherein the polar aprotic solvent is selected from the group consisting of N-methyl-2-pyrrolidinone, dimethyl sulfoxide, dimethylformamide, and combinations thereof.

18. The concentrate of claim 14, wherein NBPT is present in an amount of about 41.06% by weight; a glycol and/or a glycol derivative is present in an amount of about 1.2% by weight; an alkylene glycol alkyl ether is present in an amount of about 5.47% by weight; and a polar aprotic solvent is present in an amount of about 52.27% by weight.

19. A kit comprising:
(i) Part A, wherein Part A comprises a solution comprising N-(n-butyl) thiophosphoric triamide (NBPT) in an amount ranging from about 37.0% to about 60.0% by weight; a polar aprotic solvent in an amount ranging from about 40.0% to about 70.0% by weight; a glycol and/or a glycol derivative in an amount ranging from about 0.2% to about 2% by weight; and an alkylene glycol alkyl ether in an amount ranging from about 0.5% to about 20.0% by weight; wherein each component is present in an amount by weight of the total solution; and
(ii) Part B, wherein Part B comprises an aqueous suspension comprising one or more *Bacillus* species selected from the group consisting of *Bacillus amyloliquefaciens, Bacillus licheniformis, Bacillus thuringiensis,* and *Bacillus pumilus,*
wherein each of Part A and Part B is contained in a separate container.

* * * * *